(12) United States Patent
Porret et al.

(10) Patent No.: US 11,185,917 B2
(45) Date of Patent: Nov. 30, 2021

(54) AUSTENITIC STAINLESS STEEL WORKPIECE

(71) Applicant: The Swatch Group Research and Development Ltd, Marin (CH)

(72) Inventors: Joel Porret, Neuchatel (CH); Pablo Rodriguez, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 365 days.

(21) Appl. No.: 16/176,024

(22) Filed: Oct. 31, 2018

(65) Prior Publication Data
US 2019/0151951 A1   May 23, 2019

(30) Foreign Application Priority Data
Nov. 17, 2017   (EP) .................................... 17202337

(51) Int. Cl.
*B22F 3/24* (2006.01)
*B22F 3/10* (2006.01)
(Continued)

(52) U.S. Cl.
CPC ................ *B22F 3/24* (2013.01); *B22F 3/101* (2013.01); *B32B 15/01* (2013.01); *B32B 15/011* (2013.01);
(Continued)

(58) Field of Classification Search
CPC .............. B22F 2301/35; B22F 2207/17; B22F 2201/02; B22F 2003/1051;
(Continued)

(56) References Cited

U.S. PATENT DOCUMENTS

2013/0130058 A1* 5/2013 Iseda ....................... C22C 38/58
                                                                    428/638

FOREIGN PATENT DOCUMENTS

CN      1128051 A     7/1996
CN    104769145 A     7/2015
(Continued)

OTHER PUBLICATIONS

Machine Translation, Hisada, et al., JP S56-102501 A, Aug. 1981. (Year: 1981).*

(Continued)

*Primary Examiner* — Michael E. La Villa
(74) *Attorney, Agent, or Firm* — Oblon, McClelland, Maier & Neustadt, L.L.P.

(57) ABSTRACT

A method for manufacturing an austenitic stainless steel workpiece including the following successive steps: 1) providing a powder and sintering the powder to form a sintered alloy with an austenitic structure; the alloy having a nitrogen content greater than or equal to 0.1% by weight, 2) treating the sintered alloy to transform the austenitic structure into a ferritic structure or ferrite+ austenite two-phase structure on a surface layer of the alloy, 3) treating the sintered alloy to transform the ferritic or ferrite+ austenite two-phase structure obtained in step 2) into an austenitic structure and, after cooling, forming the workpiece which, on the layer subjected to the transformations in steps 2) and 3), has a density higher than that of the core of the workpiece. The present description also relates to the workpiece obtained by the method which has a very dense surface layer (≥99%).

10 Claims, 3 Drawing Sheets

(51) Int. Cl.
  *B32B 15/18* (2006.01)
  *C22C 38/00* (2006.01)
  *C22C 33/02* (2006.01)
  *C21D 1/26* (2006.01)
  *C21D 3/08* (2006.01)
  *C21D 1/74* (2006.01)
  *C22C 38/08* (2006.01)
  *C22C 38/02* (2006.01)
  *C21D 3/04* (2006.01)
  *C22C 38/04* (2006.01)
  *B32B 15/01* (2006.01)
  *C22C 38/40* (2006.01)
  *B32B 15/04* (2006.01)
  *B22F 10/20* (2021.01)
  *B33Y 10/00* (2015.01)
  *B33Y 80/00* (2015.01)
  *B22F 3/105* (2006.01)

(52) U.S. Cl.
  CPC .......... *B32B 15/04* (2013.01); *B32B 15/043* (2013.01); *B32B 15/18* (2013.01); *C21D 1/26* (2013.01); *C21D 1/74* (2013.01); *C21D 3/04* (2013.01); *C21D 3/08* (2013.01); *C22C 33/02* (2013.01); *C22C 33/0285* (2013.01); *C22C 38/00* (2013.01); *C22C 38/001* (2013.01); *C22C 38/02* (2013.01); *C22C 38/04* (2013.01); *C22C 38/08* (2013.01); *C22C 38/40* (2013.01); *B22F 3/105* (2013.01); *B22F 10/20* (2021.01); *B22F 2003/1051* (2013.01); *B22F 2003/248* (2013.01); *B22F 2201/02* (2013.01); *B22F 2207/17* (2013.01); *B22F 2301/35* (2013.01); *B22F 2998/10* (2013.01); *B33Y 10/00* (2014.12); *B33Y 80/00* (2014.12); *C21D 2211/001* (2013.01); *C21D 2211/005* (2013.01); *Y02P 10/25* (2015.11); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/24983* (2015.01); *Y10T 428/24992* (2015.01); *Y10T 428/26* (2015.01); *Y10T 428/263* (2015.01); *Y10T 428/264* (2015.01); *Y10T 428/265* (2015.01)

(58) Field of Classification Search
  CPC ...... B22F 2003/248; B22F 10/20; B22F 3/24; B22F 3/101; B22F 3/105; B22F 3/225; B22F 3/20; B22F 3/02; B22F 2998/10; C22C 33/02; C22C 33/0285; C22C 38/001; C22C 38/08; C22C 38/02; C22C 38/04; C22C 38/00; C22C 38/40; C21D 3/08; C21D 3/04; C21D 1/26; C21D 1/74; C21D 2211/005; C21D 2211/001; Y02P 10/25; B33Y 80/00; B33Y 10/10; Y10T 428/26; Y10T 428/263; Y10T 428/264; Y10T 428/265; Y10T 428/2495; Y10T 428/24967; Y10T 428/24983; Y10T 428/24992; Y10T 428/12958; Y10T 428/12972; Y10T 428/12979; Y10T 428/12993; B32B 15/01; B32B 15/011; B32B 15/04; B32B 15/043; B32B 15/18
  See application file for complete search history.

(56) References Cited

FOREIGN PATENT DOCUMENTS

| | | |
|---|---|---|
| CN | 106987785 A | 7/2017 |
| JP | 56-102501 | 8/1981 |
| JP | 60-218461 | 11/1985 |
| JP | 61-084302 | 4/1986 |
| JP | 1-108345 A | 4/1989 |
| JP | 05-222482 | 8/1993 |
| JP | 8-20848 A | 1/1996 |
| JP | 3709569 | 10/2005 |
| JP | 2010-222662 | 10/2010 |

OTHER PUBLICATIONS

Combined Chinese Office Action and Search Report dated Sep. 23, 2020 in corresponding Chinese Patent Application No. 201811365745.2 (with English Translation), 20 pages.
Yi Wenzhi, "Mold Heat Treatment", Hunan Science & Technology Press, 1981, pp. 215-219 (no month).
European Search Report dated May 22, 2018 in European Application 17202337.6 filed on Nov. 17, 2017 (with English Translation of Categories of Cited Documents and Written Opinion).

* cited by examiner

AUSTENITIC STAINLESS STEEL WORKPIECE

CROSS-REFERENCE TO RELATED APPLICATION

This application claims priority to European Patent Application No. 17202337.6 filed on Nov. 17, 2017, the entire disclosure of which is hereby incorporated herein by reference.

FIELD OF THE INVENTION

The present invention relates to a method for sintering austenitic stainless steels containing a significant concentration of nitrogen 0.1% by weight). The present invention also relates to the product obtained by the method which has the characteristic of having a very dense surface layer.

BACKGROUND OF THE INVENTION

The sintering of austenitic stainless steel powders is very common nowadays. It can be carried out, in particular, on workpieces obtained by metal injection moulding, extrusion, pressing or additive manufacturing. In its most traditional form, austenitic stainless steel sintering consists of the consolidation and densification of powder in a vacuum or gas protection furnace at a high temperature (1,000-1,400° C.). The properties of the workpieces after sintering (density, mechanical and magnetic properties, resistance to corrosion etc.), for a given composition, depend heavily on the sintering cycle used. The following parameters are particularly important: heating speed, sintering temperature and time, sintering atmosphere (gas, gas flow, pressure) and cooling speed.

There is usually some residual porosity after sintering austenitic stainless steels. When limited, (<5%) this porosity has little effect on mechanical, thermal or magnetic properties. However, low residual porosity is detrimental in terms of aesthetics, particularly when the workpieces are polished. They then have a milky appearance, reduced brilliance and a different colour from completely dense workpieces. For applications where aesthetics is important, it is thus necessary to find solutions for limiting or eliminating this residual porosity, at least at the surface of the workpieces.

To improve the density of sintered workpieces, several liquid phase sintering methods, may, for example, be used:

Sintering by adding one or more elements forming a liquid phase at the sintering temperature: the liquid phase thus provides a much faster diffusion path than in solids and therefore produces better densification. In austenitic stainless steels, a small amount of boron can be added for example. However, after liquid phase sintering, the microstructure and composition of the alloy are not homogeneous, which causes problems not only as regards corrosion resistance but also polishing.

Supersolidus liquid phase sintering (SLPS): this involves sintering at a temperature between the solidus and liquidus of the alloy to obtain a liquid phase portion of the alloy. However, for stainless steels, this technique is of little interest since the temperature window between the solidus and liquidus is too narrow to control the process. Further, this type of sintering produces high grain growth, which, again, is detrimental to polishing operations.

In short, the various liquid phase sintering methods are unsuitable when polishability and corrosion resistance are of primary importance, as in the fields of horology and jewellery, for example.

As an alternative, for solid phase sintered workpieces, which have closed porosity, i.e. a density of more than 90% after sintering, it is possible to carry out a high isostatic pressing treatment (HIP) to eliminate any residual porosity. This solution works well but the technology is very expensive. Moreover, workpieces made of austenitic stainless steel which have been subjected to a high isostatic pressing process are oxidised after treatment which generally involves having to machine or polish all the workpiece surfaces after treatment.

SUMMARY OF THE INVENTION

It is a main object of the present invention to propose a novel solid phase sintering method that makes it possible to obtain very high surface densities for workpieces without having to use high isostatic pressing (HIP). The method is specifically adapted for the manufacture of austenitic stainless steels with a high nitrogen content which, where necessary, makes it possible to reduce or avoid the use of nickel, known for its allergenic properties.

To this end, the present invention proposes a method comprising three steps, with a first conventional step of sintering the powder in the austenite range. In a second step, the alloy obtained in the first step is treated in the ferrite range or in the ferrite+ austenite two-phase range to form a surface layer containing ferrite. Due to its crystallographic structure which is less compact than that of austenite, ferrite allows faster diffusion of the alloying elements and, thereby, better densification. In a third step, the alloy is treated in the austenite range to remove the ferrite previously formed at the surface.

Advantageously, the second step is carried out by adjusting the temperature and/or controlling the atmosphere to remove nitrogen and/or carbon from the surface. Conversely, in the third step, the surface is carburized or nitrided to promote austenite formation.

Advantageously, the total hold time in the second and third steps is kept below 20 hours to increase productivity and avoid excessive austenitic grain growth which is detrimental for polishing operations.

The method according to the invention thus makes it possible to obtain austenitic stainless steel workpieces with completely dense surfaces without any residual ferrite, with a limited grain size and with reasonable cycle times. After polishing, the brightness and colour of these workpieces are comparable to those of workpieces obtained by conventional metallurgy (casting+ thermomechanical treatments) or subjected to a high isostatic pressing process.

Other advantages will appear from the features set out in the claims, and from the detailed description of the invention illustrated hereinafter with reference to the annexed drawings, given as non-limiting examples.

BRIEF DESCRIPTION OF THE DRAWINGS

FIG. 3 represents an enlargement at the junction between the dense surface layer and the porous core and FIG. 4 represents a sectional view of the entire sample.

DETAILED DESCRIPTION OF THE INVENTION

The present invention relates to a novel method for sintering austenitic stainless steels. It also relates to the workpiece obtained by the method which may be, in particular, an external watch component or a piece of jewellery.

The method of the invention applies to all austenitic stainless alloys containing a significant concentration of nitrogen or of nitrogen and carbon and wherein it is possible to form ferrite during sintering. A 'significant concentration' means a concentration higher than or equal to 0.1% by weight of nitrogen, possibly with a concentration of carbon higher than or equal to 0.1% by weight. This concentration of N or of N+C can be present in the initial powder or result from the N and C enrichment of the alloy during sintering in a controlled atmosphere. The initial powder is therefore not necessarily a 100% austenitic powder but may contain ferrite.

Among the most common alloys, this more particularly concerns the following grades: 316LN (1.4406, 1.4429) and 317LN (1.4434), but also the following grades: 1.4466, 1.4537, 1.4547, 1.4652, 1.4659, 1.4529 and 1.4565. Further, all austenitic stainless steels in which nickel is completely offset (Ni≤0.5%) or partially offset by nitrogen, or by nitrogen and carbon, can also be sintered according to the invention, such as for example the following grades: 1.3816, 1.3815, 1.4456, 1.4452 or 1.3808 (UNS S29225). Added to these alloys are all stainless steels wherein nitrogen or nitrogen and carbon could be added to the powder, prior to or during sintering.

Figure 2:
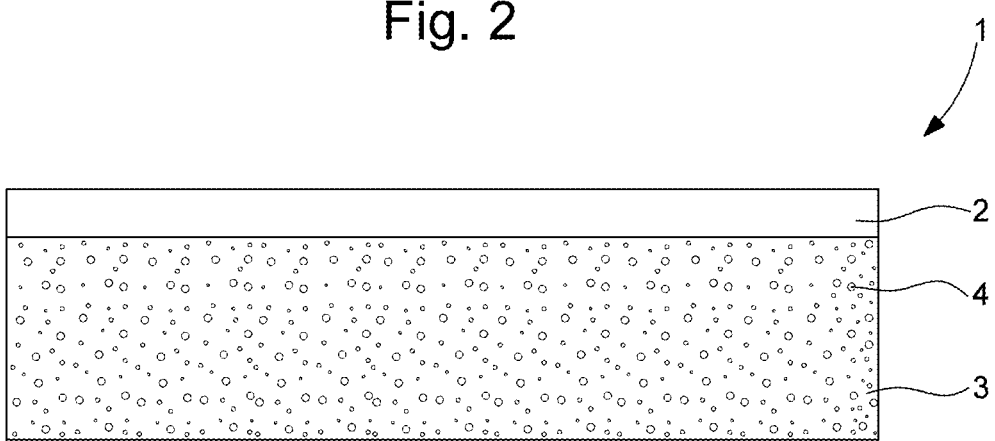
FIG. 2 schematically represents one portion of the workpiece obtained by the method according to the invention having a surface layer of higher density than that of the core.

The method according to the invention makes it possible to form a stainless steel workpiece with no residual ferrite having a surface layer of higher density than that of the core of the workpiece. This layer preferably has a thickness greater than or equal to 20 µm, more preferably greater than or equal to 30 µm, and still more preferably, greater than or equal to 50 ρm. Qualitatively, this difference in density between the surface layer and core can easily be visualized by light microscopy in a cross section of the sample where a clear transition is observed between the very dense layer and the porous core. This transition in a cross section of workpiece 1 is schematically represented in FIG. 2, which shows core 3 including pores 4, topped by a layer 2 devoid or virtually devoid of pores. Quantitatively, the porous volume of the core and of the surface can be determined by light microscopy image analysis of polished sections of the sample. Preferably, the surface has a relative density comprised between 99% and 100% 99%). The porous core has a relative density of more than 90% and less than 99% (<99%). Further, the absence of ferrite from the core and surface of the workpiece can be confirmed by light microscopy, X-ray diffraction or by magnetic property measurement techniques.

The sintering method according to the invention includes the following steps, carried out in a controlled atmosphere in a temperature range of between 900 and 1,400° C., selected as a function of the steel composition:

1) A first step of sintering the powder in the 100% austenite range in an atmosphere containing a nitrogen carrier gas ($N_2$ for example). The powder typically has a diameter D90 comprised between 5 and 100 µm. During this step, the nitrogen concentration in the alloy is fixed while the workpieces are densified until open porosity is removed. The nitrogen concentration, for a given alloy, depends on the temperature and the partial pressure of the nitrogen carrier gas (≥0.1 bar). The carbon concentration in the alloy depends on the initial carbon concentration in the powder, any residues from organic binders used for the powder forming process and reactions between carbon and the atmosphere during sintering (carbon reduction by oxygen, decarburization, etc.). Thus, other gases can be used in addition to the nitrogen carrier gas for oxide reduction (for example $H_2$), to adjust the carbon concentration (for example CO, $CH_4$) or to adjust the total pressure (for example Ar). Generally, this single sintering step in the austenite range is used in the prior art for sintering austenitic stainless steels.

2) The object of a second step is to densify the workpieces, at least at the surface, by forming ferrite at the surface. Indeed, since the diffusion of alloying elements in the body-centred cubic structure of ferrite is approximately two orders of magnitude higher than the diffusion of elements in the face centred cubic structure of austenite, densification is much higher in the presence of ferrite. There are several possible solutions for forming ferrite at the surface of the workpieces:

A. Setting the temperature such that the alloy has a ferrite+ austenite two-phase or completely ferritic structure. At the surface, the nitrogen and carbon, which stabilise the austenite phase, can be released into the atmosphere by diffusion into the solid, and ferrite formation is facilitated, since the solubility of carbon and nitrogen is much lower in ferrite. In the core, where the nitrogen and carbon concentration has not been reduced by diffusion through the surface, the alloy composition remains unchanged, since the porosity was closed in the first step. Preferably, the temperature will be set such that there is a ferrite+ austenite two-phase, or completely ferritic structure at the surface and a completely austenitic structure in the core, but it is possible, depending on the alloy and the parameters used in the first two sintering steps, for a small amount of ferrite to also form in the core in this step.

B. Setting the partial pressure of the nitrogen carrier gas, or working in a nitrogen free atmosphere, to reduce the amount of nitrogen at the surface of workpieces by denitriding and thereby form an austenite+ ferrite or completely ferritic surface structure. In the core, where the nitrogen concentration has not been reduced by diffusion through the surface, the alloy composition remains unchanged and the structure remains completely austenitic.

C. Setting the partial pressure of the carbon carrier gas, which is, for example, CO or $CH_4$ to reduce the amount of carbon at the surface of the workpieces by decarburization or more simply using a decarburizing atmosphere, for example with $H_2$, if the alloy already contains carbon. Again, the atmosphere must then be selected such that the alloy has an austenite+ ferrite two-phase or completely ferritic structure at equilibrium. In the core, where the carbon concentration has not been reduced by diffusion through the surface, the alloy composition remains unchanged and the structure remains completely austenitic.

D. Using Any Combination of Solutions A, B and C.

In short, in this step, the object is to form ferrite at the surface of the workpieces to obtain a very dense layer. Since the ferrite is formed by denitriding and/or decarburization which are diffusion phenomena in solids, the thickness of this densified layer containing ferrite, for a given composition, depends on the temperature, duration of the step and partial pressures of nitrogen and/or carbon carrier gases. In the core, where the nitrogen and carbon concentration has not been reduced by diffusion through the surface, the composition and thus the structure remain unchanged, since the porosity was closed in the first step. However, if the temperature is different between the first and second steps, it is possible for a small amount of ferrite to form in the core too, although the composition remains unchanged.

3) A third step to eliminate the ferrite formed at the surface. The elimination of ferrite from the surface is carried out by renitriding and/or recarburizing the workpieces through a suitable choice of temperature, partial pressure of the nitrogen carrier gas (≥0.1 bar) and possibly the partial pressure of the carbon carrier gas. These parameters must be set so that the alloy has a completely austenitic structure at equilibrium. Since nitriding and carburization are diffusion phenomena, the thickness of the diffusion layer depends on time and temperature for a given alloy and atmosphere. The parameters of this step are thus dependent on the preceding step and must be set such that all the ferrite is transformed into austenite. Indeed, the presence of ferrite in the workpieces is not desired, since ferrite reduces corrosion resistance and exhibits ferromagnetic behaviour. The third step is conventionally followed by cooling with a cooling speed adapted according to the composition to keep an austenitic structure at ambient temperature.

Ideally, these different steps are carried out during the same sintering cycle. However, they can also be carried out separately. The sintering principle can also comprise a post-treatment on workpieces that have been sintered in a different manner (laser sintering, sparks plasma sintering SPS, etc.).

This sintering method was successfully applied to several different powders. It was applied, in particular, to nickel-free austenitic stainless steel workpieces formed by metal injection moulding.

By way of example, the three-step sintering method according to the invention is explained below with the aid of a phase diagram. This diagram for a given alloy makes it possible, in particular, to predict the existing phases as a function of temperature. For austenitic stainless steels, it is also prudent to observe the effect of nitrogen concentration, since it can be adjusted during the sintering process, especially via temperature and partial pressure of nitrogen. A phase diagram for stainless steel Fe-17.5Cr-11Mn-3.5Mo-xN is presented in FIG. 1A. The area that corresponds to a 100% austenitic alloy is referenced FCC_A1. The ferrite corresponds to the phase BCC_A2 and appears when the nitrogen concentration is too low at a given temperature or when the temperature is too high for a given partial pressure of nitrogen. Finally, the effect of nitrogen partial pressure on the nitrogen concentration in the alloy is illustrated by isobaric curves for nitrogen partial pressures of 100, 400 and 900 mbars. In this Fe-17.5Cr-11Mn-3.5Mo-xN powder, the carbon concentration is low (<0.1%) and the sintering is carried out in an atmosphere containing a partial pressure of nitrogen (N2). The method according to the invention makes it possible to obtain a very high surface density for workpieces as a result of steps 1, 2 and 3 represented in the phase diagram by circles respectively for the core and surface of the workpiece in FIGS. 1B and 1A. In this example, the nitrogen partial pressure is maintained at 400 mbars in the three steps and the surface phase change is obtained by changing the temperature. The three steps are as follows:

1) Powder nitriding and densifying until the open porosity is eliminated in the 100% austenite range. It is the temperature and nitrogen partial pressure that allows the nitrogen concentration in the allow to be adjusted. The time required for satisfactory powder nitriding depends on the powder size. However, for particles having a D90 of less than 100 microns and for a temperature higher than 1,000° C., the nitriding speed is relatively fast, i.e. less than one hour. Densifying until the pores are closed is, however, longer and generally requires several hours. Thus, the sample with a thickness of around 10 mm was kept at a temperature of 1,150° C. for 3 hours to reach a nitrogen content in the alloy of 0.75% by weight at equilibrium (circle 1 in FIGS. 1A and 1B), by densifying the sample until open porosity was eliminated.

2) Increasing the temperature to 1,220° C. to obtain, at thermodynamic equilibrium, a ferrite+ austenite two-phase structure, the step being 1 hour at this temperature. At the surface, nitrogen is released into the atmosphere and ferrite formation is fast (circle 2 in FIG. 1A). For the core where the nitrogen concentration has not decreased, the structure remains austenitic despite the temperature increase (circle 2 in FIG. 1B).

Figure 1A:
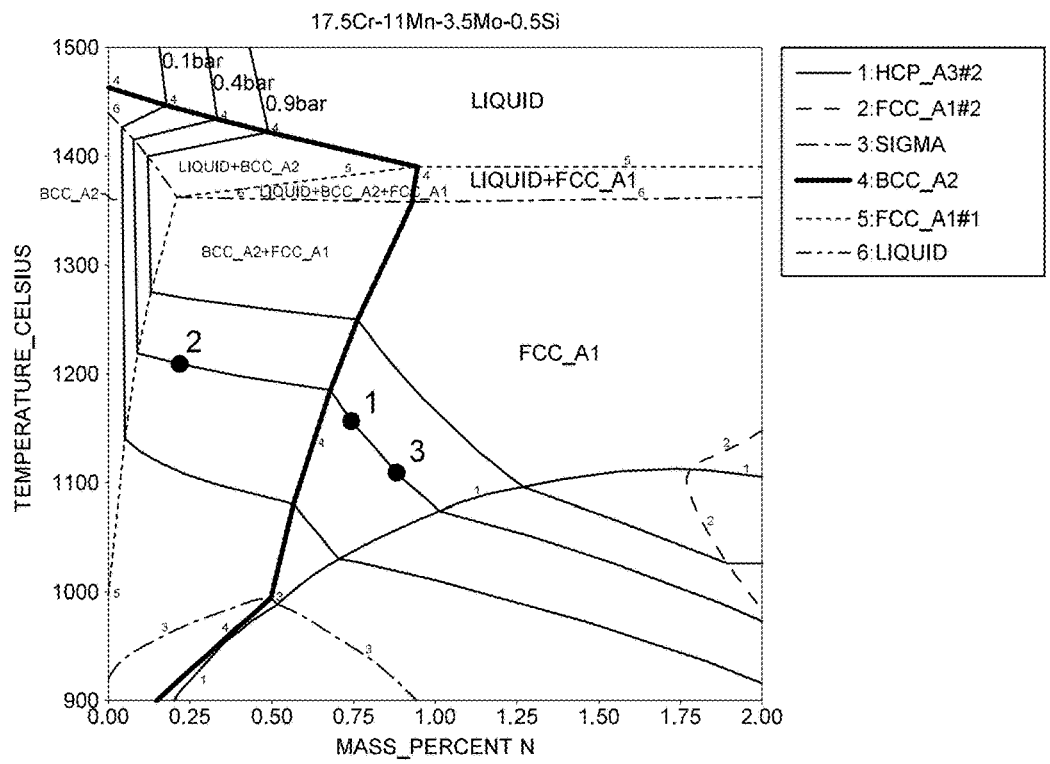
FIGS. 1A and 1B illustrate, in a phase diagram for a stainless steel composition, the phase changes induced by the three steps of the sintering method according to the invention, with respectively, in FIG. 1A, the phase changes at the surface of the workpiece and, in FIG. 1B, the phase changes at the core of the workpiece.
Figure 1B:
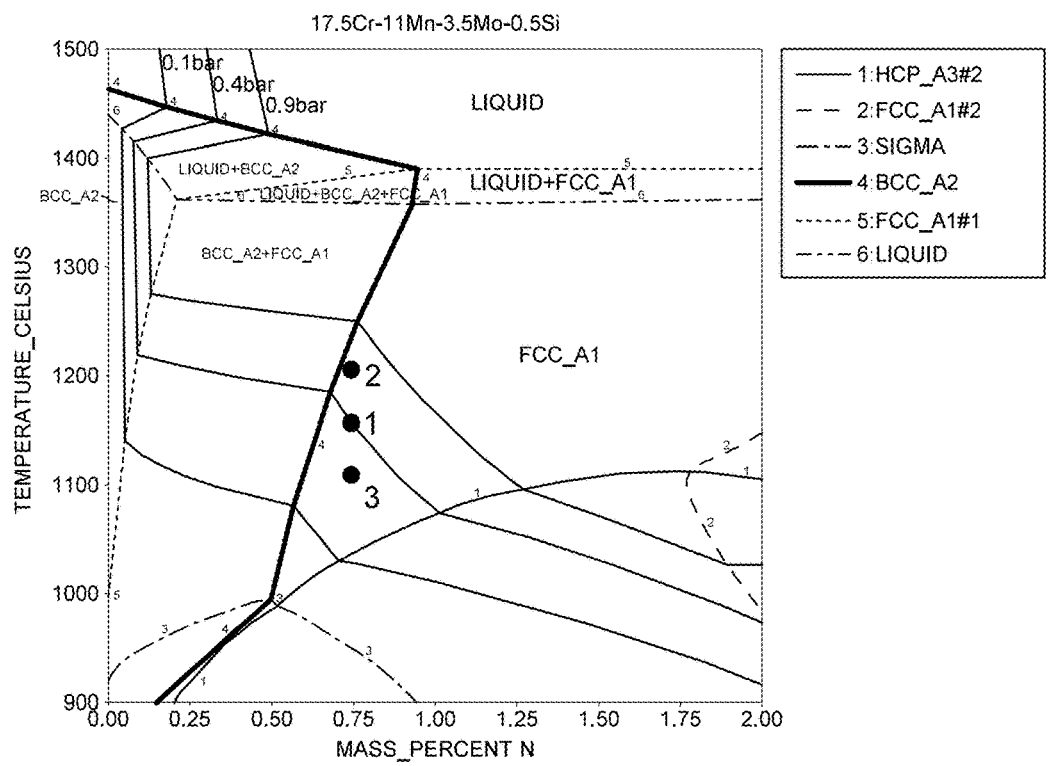

3) Eliminating the ferrite present at the surface by renitriding at a lower temperature of 1,100° C. with a hold time of 2 hours (circle 3 in FIGS. 1A and 1B). The temperature and hold time are set such that the ferrite at the surface is completely eliminated.

Figure 3:
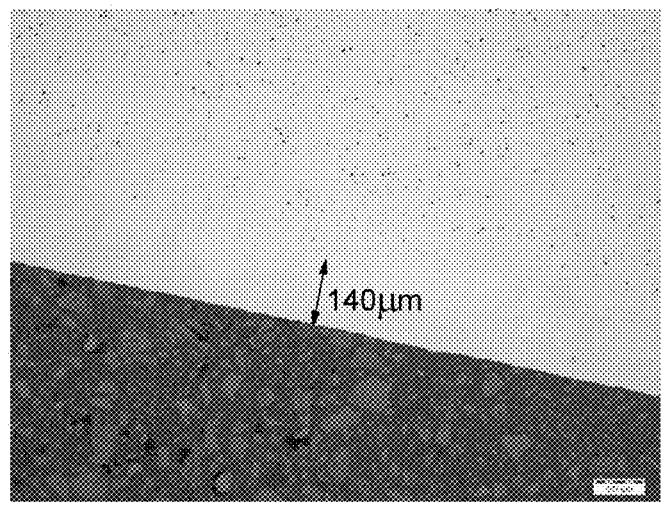
FIGS. 3 and 4 represent a sectional micrograph of a sample produced by the method of the invention. More specifically.
Figure 4:
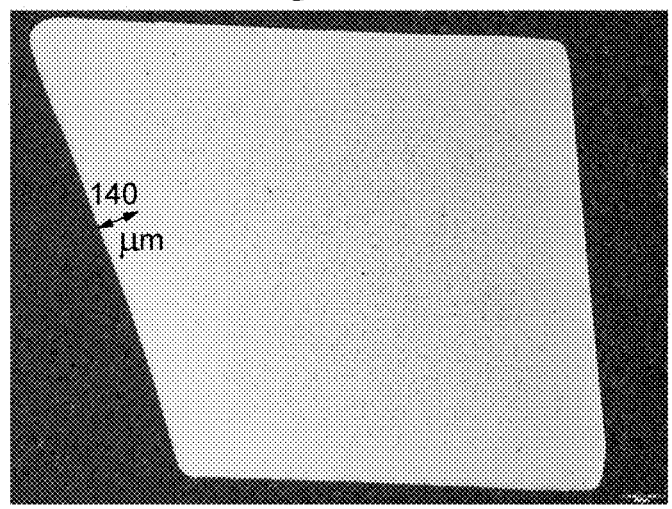
Figure 5:
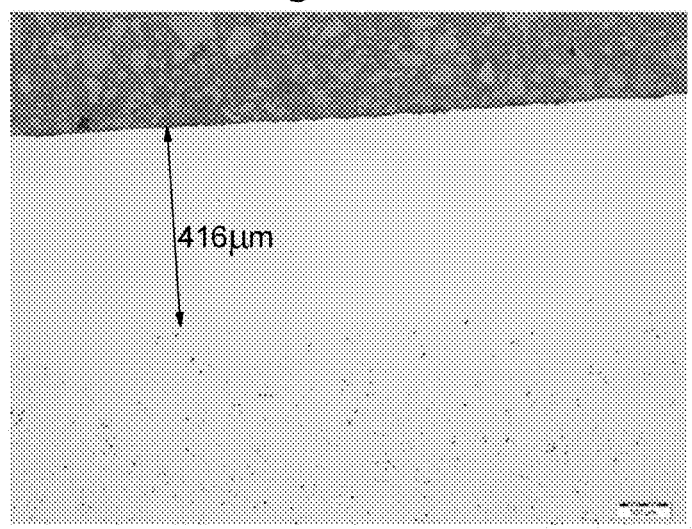
FIG. 5 represents a similar sectional view to that of FIG. 3 for a sample produced by the method of the invention with parameters adapted to increase the thickness of the dense layer.

At the end of this method, workpieces are obtained that have no residual ferrite and very high surface density, as shown by the micrographs of FIGS. 3 and 4, with a dense layer having a thickness of 100-150 μm. By extending the treatment time in steps 2) and 3) to 4 and 8 hours respectively, all other things being equal, the thickness of the layer is increased to 400-450 μm (FIG. 5).

It will be specified that by further extending the temperature hold time, it would be possible, in steps 2) and 3) to form ferrite throughout the entire workpiece and then to nitride or carburize/nitride the entire workpiece to form, finally, a 100% austenitic workpiece having a relative density higher than or equal to 99% throughout. However, for workpieces such as external timepiece parts which typically have thickness of more than 1.5 millimetres, this would lead to very long cycle times of more than 20 hours and, as a corollary, an excessive grain growth which is very detrimental for polishing operations (orange peel effect). Thus, preferably, the surface layer has a thickness of less than 0.75 mm, and more preferably less than 0.5 mm, and the austenitic grain has a mean size of less than 300 μm, preferably less than 100 μm, and more preferably less than 50 μm.

The invention claimed is:

1. A austenitic stainless steel workpiece having a nitrogen content greater than or equal to 0.1% by weight, wherein
the workpiece has a surface layer having a density higher than that of a core of the workpiece, and
the austenitic stainless steel has a nickel content less than or equal to 0.5% by weight.

2. The workpiece according to claim 1, wherein the surface layer has a minimum thickness of 20 μm.

3. The workpiece according to claim 1, wherein the surface layer has a thickness of less than 0.75 mm.

4. The workpiece according to claim 1, wherein the surface layer has a density of between 99 and 100% of a density of materials of the workpiece in their densest state.

5. The workpiece according to claim 1, wherein the austenitic stainless steel has a combined carbon and nitrogen content greater than or equal to 0.2% by weight.

6. The workpiece according to claim 1, wherein the austenitic stainless steel has a mean grain size of less than 300 µm.

7. The workpiece according to claim 1, wherein the workpiece is for a timepiece or piece of jewelry.

8. A watch or piece of jewelry comprising the workpiece according to claim 1.

9. The workpiece according to claim 1, wherein the surface layer has a thickness of at least 150 µm.

10. The workpiece according to claim 1, wherein the austenitic stainless steel is nickel free.

\* \* \* \* \*